(12) United States Patent
Zhou

(10) Patent No.: US 8,842,236 B2
(45) Date of Patent: Sep. 23, 2014

(54) BACKLIGHT MODULE AND LIQUID CRYSTAL DISPLAY DEVICE

(71) Applicant: Shenzhen China Star Optoelectronics Technology Co., Ltd., Guangdong (CN)

(72) Inventor: Gege Zhou, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 148 days.

(21) Appl. No.: 13/643,094

(22) PCT Filed: Sep. 20, 2012

(86) PCT No.: PCT/CN2012/081633
§ 371 (c)(1),
(2), (4) Date: Oct. 24, 2012

(87) PCT Pub. No.: WO2014/040303
PCT Pub. Date: Mar. 20, 2014

(65) Prior Publication Data
US 2014/0071371 A1    Mar. 13, 2014

(30) Foreign Application Priority Data
Sep. 12, 2012   (CN) .......................... 2012 1 0336034

(51) Int. Cl.
*G02F 1/1333*   (2006.01)
*G02F 1/1335*   (2006.01)
*G09F 13/04*    (2006.01)

(52) U.S. Cl.
CPC .......... *G09F 13/04* (2013.01); *G02F 1/133615* (2013.01)

USPC .................................. 349/58; 349/60; 349/61

(58) Field of Classification Search
CPC .................. G02F 1/133615; G02F 1/133603; G02F 1/133604; G02F 1/133308; G02F 1/133608; G02F 1/13452; G02F 2001/133607; G02B 6/0053
USPC ................................. 349/58, 60, 61
See application file for complete search history.

(56) References Cited

U.S. PATENT DOCUMENTS 8,573,811 B2 * 11/2013 Lin et al. ........................ 362/294
2013/0322113 A1 * 12/2013 Yang ............................. 362/606

* cited by examiner

*Primary Examiner* — Mike Qi
(74) *Attorney, Agent, or Firm* — Andrew C. Cheng

(57) ABSTRACT

The present invention provides a backlight module includes a light source, a heatsink, and a front frame. The light source is arranged onto the heatsink, and the front frame is provided with at least a limiting arrangement pressing the light source intimately seated onto the heatsink. The present invention further discloses a liquid crystal display device incorporated with the backlight module described above. With the provision of the limiting arrangement installed on the front frame of the backlight module, the light source can be securely and closely in thermal contact with the heatsink. As a result, the heat generated by the light source can be readily and effectively dissipated by the heatsink. With the performance of the heat dissipation increased, the light source installed on the backlight module can also be upgraded with their power. Further, the liquid crystal display device incorporated with such backlight module is also benefited.

18 Claims, 5 Drawing Sheets

BACKLIGHT MODULE AND LIQUID CRYSTAL DISPLAY DEVICE

CROSS REFERENCE

This application is claiming a priority arisen from a patent application, entitled with "Backlight Module and Liquid Crystal Display Device", submitted to China Patent Office on Sep. 12, 2012, designated with an Application Number 201210336034.9. The whole and complete disclosure of such patent application is hereby incorporated by reference.

The present invention relates to a technical field of liquid crystal display, and more particularly, to a backlight module and a liquid crystal display device incorporated with such a backlight module.

DESCRIPTION OF PRIOR ART

Typically, a liquid crystal display device includes a display panel in which a light source, or so called a backlight module, has to be incorporated so as to display patterns, and figures on the panel. Currently, the light source incorporated within the backlight module can be categorized into CCFL (cold cathode fluorescent lamp), and LED (light emitting diode). The LED is comparably new device in the liquid crystal display device, and which features brighter and lower energy consumption. Accordingly, the LED has become more and more popular in the backlight module. However, during the working of the LED, it will generate considerable amount of heat inevitably. As a result, in order to prolong its life span, a heatsink or heat-dissipating device has to be incorporated with the LED.

As shown in FIG. 5, it is a partial, cross sectional view of a backlight module. The light source 7 is simply locked to the heatsink 8 by screw or glue. The front frame 9 is used to attach with other components. It is found by the inventors that this prior art configuration inherits with the following defects: since there is no measurement to ensure a close and intimate thermal contact between the light source 7 and the heatsink 8, the heat generated by the light source 7 can not effectively transferred to the heatsink 8. Specially, if the light source 7 because separated with the heatsink 8 because of the loose of the screw or failure of glue, the performance of the heatsink 8 becomes even poor.

SUMMARY OF THE INVENTION

It is an object of the present invention to provide a backlight module in which a genuine heatsink is incorporated so as to effectively dissipate the heat generated from the light source. The present invention also relates to a liquid crystal display device incorporated with such a backlight module.

In order to resolve the technical issues encountered by the prior art, the present invention provides a backlight module includes a light source, a heatsink, and a front frame. The light source is arranged onto the heatsink, and the front frame is provided with at least a limiting arrangement pressing the light source intimately seated onto the heatsink.

Further, the front frame includes a vertical tab and a horizontal tab having a certain angle arranged therebetween. The heatsink is arranged onto the vertical tab, and the light source is arranged on the vertical tab at a position distant to the front frame. The limiting arrangement is arranged on the inner wall of the horizontal tab.

Further, the limiting arrangement includes a rib or at least an embossment pressing against the light source so as to closely seat onto the heatsink.

Further, at least one rib is received into a recess defined between the light source and an optical portion of the backlight module. The rib includes two inclined surfaces within one surface presses onto the light source, and the other surface presses against the optical component so as to make the light source closely in contact with the heatsink.

Further, the rib is integrally formed with the horizontal tab of the front frame.

Further, at least one embossment is received into a recess defined between the light source and an optical portion of the backlight module. The embossment includes two inclined surfaces within one surface presses onto the light source, and the other surface presses against the optical component so as to make the light source closely in contact with the heatsink.

Further, the rib is arranged on a common line of the inner wall of the horizontal tab of the front frame.

Further, the optical component includes at least a waveguide.

Further, the heatsink is made from an aluminum extrusion.

The present invention further includes a liquid crystal display device incorporated with the backlight module.

With the provision of the limiting arrangement installed on the front frame of the backlight module, the light source can be securely and closely in thermal contact with the heatsink. As a result, the heat generated by the light source can be readily and effectively dissipated by the heatsink. With the performance of the heat dissipation increased, the light source installed on the backlight module can also be upgraded with their power. Further, the liquid crystal display device incorporated with such backlight module is also benefited.

DETAILED DESCRIPTION OF PREFERRED EMBODIMENTS

Figure 1:
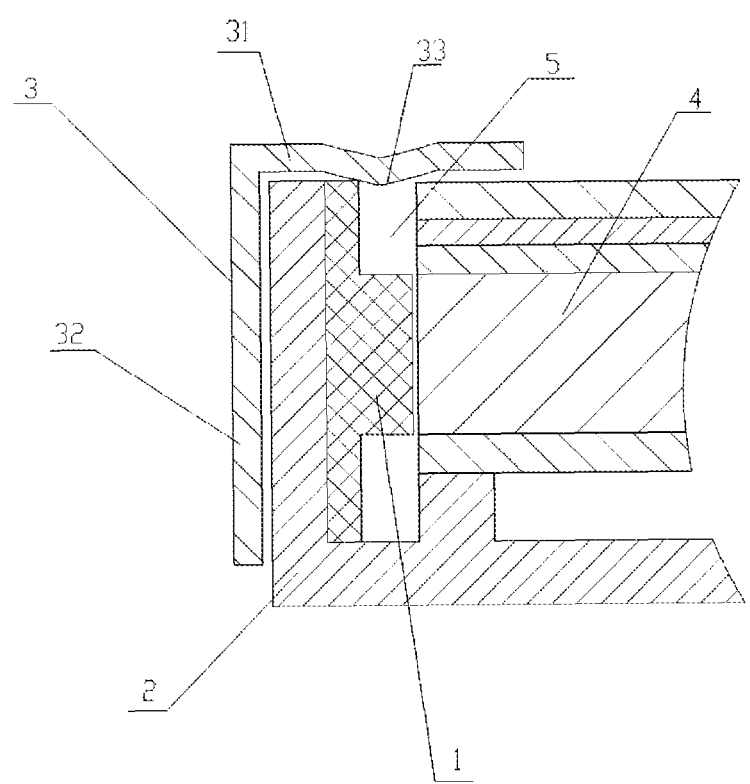
FIG. 1 is a partial and cross sectional view of a backlight module made in accordance with a first embodiment of the present invention.

Detailed description will be given by the preferred embodiments along with the accompanied drawings.

As shown in FIGS. 1 to 4, the present invention provides a backlight module which includes a light source 1, a heatsink 2, and a front frame 3. The light source 1 is seated onto the heatsink 2. The front frame 3 includes a limiting arrangement for pressing the light source 1 closely seated onto the heatsink 2. Substantially, the front frame 3 includes a horizontal tab 31 and a vertical tab 32. The heatsink 2 is disposed onto the vertical tab 32, and the light source is disposed on the vertical tab 32, and the limiting arrangement is disposed on the inner wall of the horizontal tab 31.

With the provision of the limiting arrangement disposed on the front frame 3, the light source 1 can closely in thermal contact with the heatsink 2. As a result, the heat generated by the light source 1 can be effectively and quickly dissipated to externally. Consequently, the heat dissipating capacity of the heatsink 2 can be fully fulfilled. This is really beneficially to the heat dissipating performance of the backlight module. Detailed description of the backlight module will be given herebelow.

The heatsink 2 can be implemented from an aluminum extrusion or other suitable material. The light source 1 can be implemented by LED embedded onto a MCPCB (Metal Core PCB) so as to form a light strip. The light source 1 is then attached to the heatsink 2 by way of glue or screw.

First Embodiment:

Referring to FIG. 1, the backlight module includes the light source 1, the aluminum extrusion 2 and a front frame 3.

The front frame 3 is arranged adjacent to the aluminum extrusion 2. The limiting arrangement embodied in the present invention is a rib 33 disposed onto an inner wall of the horizontal tab 31 of the front frame 3. When the front frame 3 is assembled to the backlight module, the rib 33 will press against to the light source 1 such that the light source 1 is closely in thermal contact to the aluminum extrusion 2. By this arrangement, the light source 1 and the aluminum extrusion 2 can be frozen in such a closely and thermal contact and the heat generated from the light source 1 can be effectively dissipated with the full function of the aluminum extrusion 2. In the present invention, the rib 33 will not in contact with the optical component 4 of the backlight module so as to reduce any negative affect thereto.

In the present invention, the position in which the rib 33 is arranged can be readily adjusted with respect to the light source 1 and the thickness of the aluminum 2. As long as the rib 33 can effectively press against to the light source 1 when the front frame 1 is assembled to the backlight module.

Figure 2:
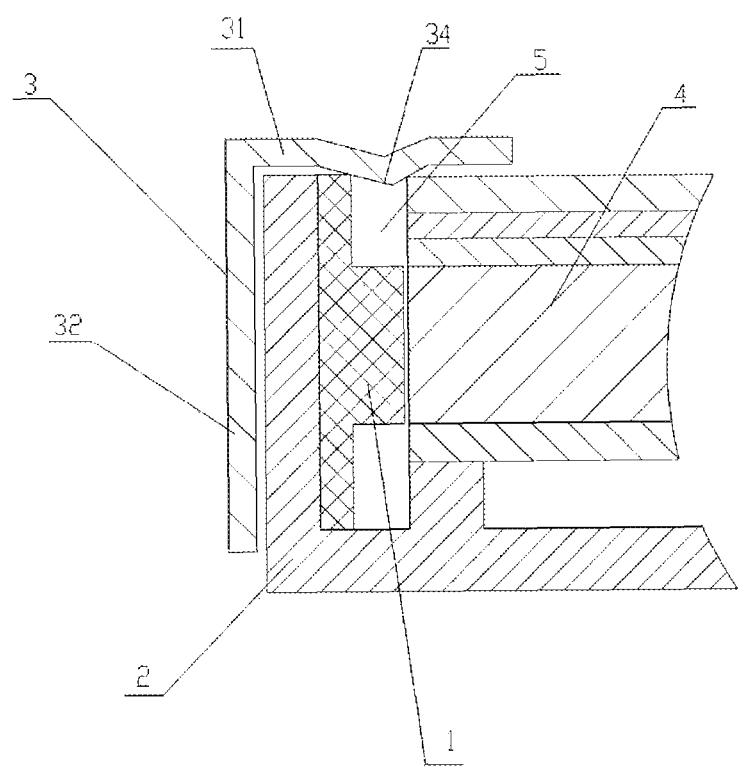
FIG. 2 is a partial and cross sectional view of a backlight module made in accordance with a second embodiment of the present invention.

Second Embodiment:

Referring to FIG. 2, in the present invention, the limiting arrangement is still embodied as a rib 34 identical to what disclosed in FIG. 1. The rib 34 is arranged onto the inner wall of the horizontal tab 31. In addition, a recess 5 is defined between the light source 1 and an optical component 4. The optical component 4 includes a first diffuser, a prism, a second diffuser, and a waveguide. The optical component 4 is arranged facing toward a light-emitting surface of the light source 1.

When the front frame 3 is assembled to the backlight module, the rib 34 is disposed within the recess 5 defined between the light source 1 and the optical component 4. The rib 34 includes first and second inclined surfaces with the first inclined surface press onto the light source 1, and the second inclined surface press onto the optical component 4. By this arrangement, the light source 1 can be closed in contact with the aluminum extrusion 2. With the closely in contact between the light source 1 and the aluminum extrusion 2, the heat generated by the light source 1 can be effectively dissipated by the aluminum extrusion 2. With this embodiment, the dual inclined surfaces can effectively press the light source 1 toward the aluminum extrusion 2 so as to keep the heat dissipation functioned as it should. The difference between the first and second embodiments is detailed as below. In the second embodiment, the rib 34 is in contact with the light source 1 and the optical component 4, respectively. In the first embodiment, the rib 33 is in contact with the light source 1, while is separated to the optical component 4.

In the current embodiment, the position in which the rib 34 is arranged can be readily adjusted with respect to the light source 1 and the thickness of the aluminum 2. As long as the rib 34 can effectively press against to the light source 1 and the optical component 4 when the rib 34 is received within the recess 5.

In the actual implementation of the first and second embodiments, the rib 33 or 34 an be readily and integrally formed with the front fame 3 by way of pressing and forming. The working procedure is comparably simple, and the cost can be effectively controlled.

Figure 3:
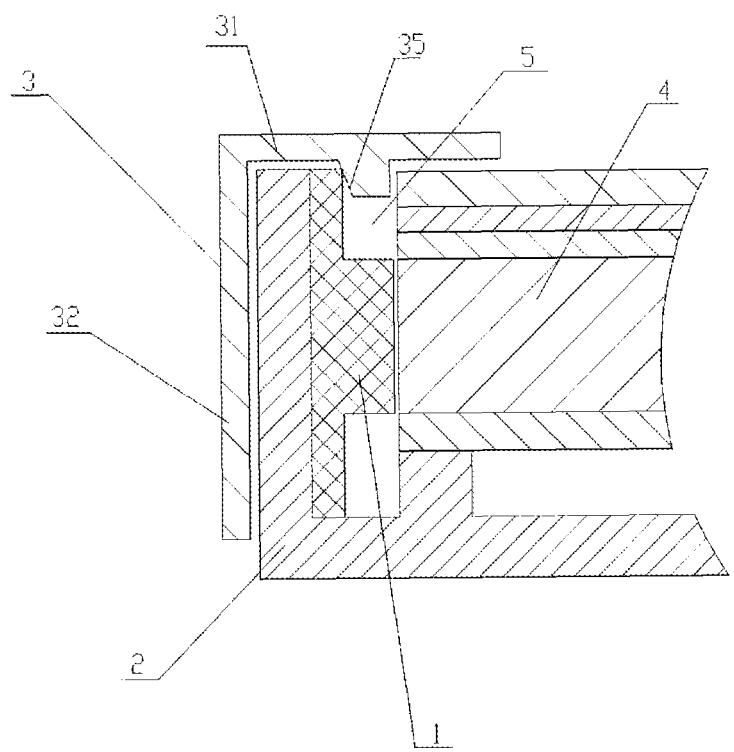
FIG. 3 is a partial and cross sectional view of a backlight module made in accordance with a third embodiment of the present invention.

Third Embodiment:

Referring to FIG. 3, the difference with respect to the first and second embodiments is that the limiting arrangement is implemented as an embossment or post 35. The embossment 35 can effectively press upon the light source 1 so as to clearly in thermal contact with the aluminum extrusion 2. By this arrangement, the light source 1 and the aluminum extrusion 2 can be arranged in closely and thermal contact with each other, and the heat generated by the light source 1 can be effectively dissipated, as it should. In this embodiment, the embossment 35 will not in contact with the optical component 4 of the backlight module, and thereby reducing any impact to the optical component 4.

In the present embodiment, the position in which the embossment 35 is arranged can be readily adjusted with respect to the light source 1 and the thickness of the aluminum 2. As long as the embossment 35 can effectively press against to the light source 1 when the front frame 1 is assembled to the backlight module.

Figure 4:
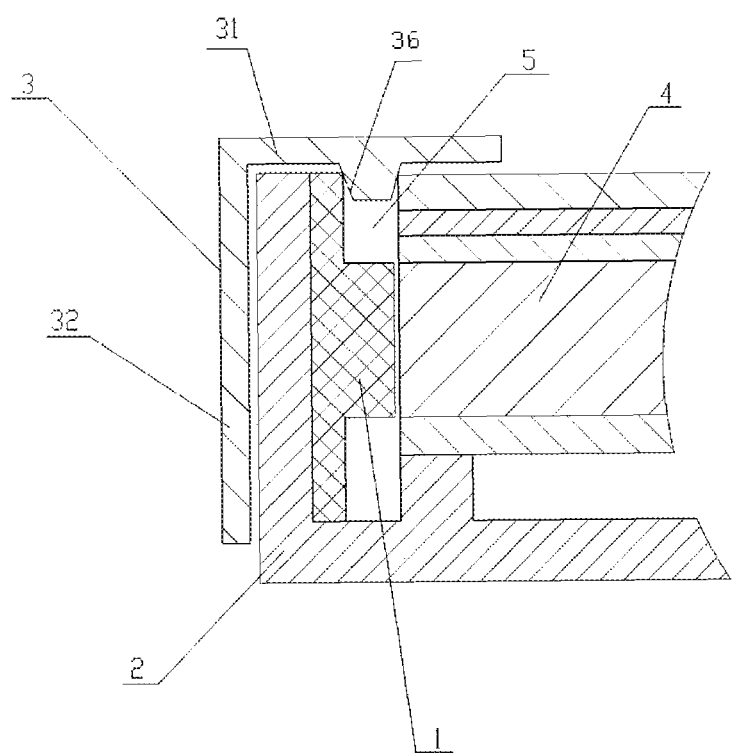
FIG. 4 is a partial and cross sectional view of a backlight module made in accordance with a fourth embodiment of the present invention.
Figure 5:
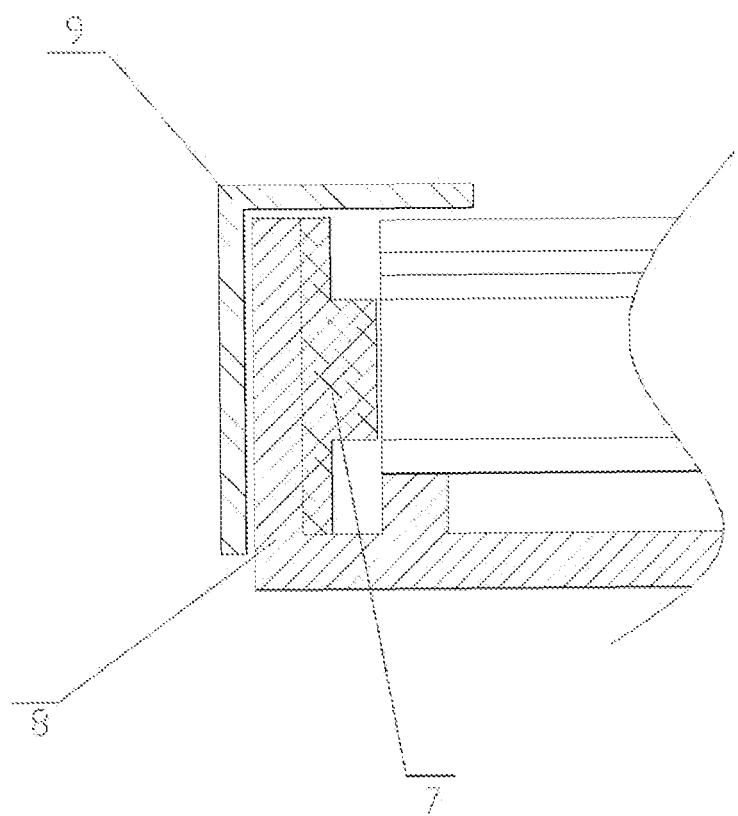
FIG. 5 is a partial and cross sectional view of a prior art backlight module.

Fourth Embodiment:

Referring to FIG. 4, the fourth embodiment is similar to the third embodiment in which the limiting arrangement is implemented as an embossment or post 36. The embossment 36 is received within the recess 5 located between the light source 1 and the optical component 4. An end of the embossment 36 abuts against the light source 1, and the other end is pressed onto the optical component 4. By this arrangement, the light source 1 is tightly and closely in contact with the aluminum extrusion 2. By the provision of this embodiment, the light source 1 and the aluminum extrusion 2 is in closely and thermal contact with each other, and the aluminum extrusion 2 can readily function as it should to dissipate heat transferred thereto. Since the embossment 36 provides dual-end compression, and it reaches a better result. The difference between the third and fourth embodiments is that in the fourth embodiment, the embossment 36 is in contact with the light source 1 and the optical component 4, respectively; while in the third embodiment, the embossment 35 is in contact with only the light source 1, and is separated to the optical component 4.

In the current embodiment, the position in which the embossment 36 is arranged can be readily adjusted with respect to the light source 1 and the thickness of the aluminum 2. As long as the embossment 36 can effectively press against to the light source 1 and the optical component 4 when the embossment 36 is received within the recess 5.

From the first to the fourth embodiments, either the rib or the embossment is not limited to a regular formation. It can be readily embodied as a serial of discrete ribs or embossments arranged aligned with each other. The shape and form of the rib or embossment can also be readily designed according to the field requirements. For example, in the first and third embodiments, either the rib or the embossment has to effectively press upon the light source 1, while in the second and fourth embodiments, either the rib or the embossment have to press upon onto the light source 1 and the optical component 4, respectively and firmly.

The present invention further discloses a liquid crystal display device in which a backlight module from any one of the above described backlight module is incorporated.

With the provision of the limiting arrangement installed on the front frame of the backlight module, the light source can be securely and closely in thermal contact with the heatsink. As a result, the heat generated by the light source can be readily and effectively dissipated by the heatsink. With the performance of the heat dissipation increased, the light source installed on the backlight module can also be upgraded with their power. Further, the liquid crystal display device incorporated with such backlight module is also benefited.

The invention claimed is:

1. A backlight module comprising a light source, a heatsink, and a front frame, wherein the light source is arranged onto the heatsink, and the front frame is provided with at least a limiting arrangement pressing the light source intimately seated onto the heatsink.

2. The backlight module as recited in claim 1, wherein the front frame includes a vertical tab and a horizontal tab having a certain angle arranged therebetween, the heatsink is arranged onto the vertical tab, and the light source is arranged on the vertical tab at a position distant to the front frame. The limiting arrangement is arranged on the inner wall of the horizontal tab.

3. The backlight module as recited in claim 2, wherein the limiting arrangement includes a rib or at least an embossment pressing against the light source so as to closely seat onto the heatsink.

4. The backlight module as recited in claim 3, wherein at least one rib is received into a recess defined between the light source and an optical portion of the backlight module. The rib includes two inclined surfaces within one surface presses onto the light source, and the other surface presses against the optical component so as to make the light source closely in contact with the heatsink.

5. The backlight module as recited in claim 4, wherein the rib is integrally formed with the horizontal tab of the front frame.

6. The backlight module as recited in claim 3, wherein at least one embossment is received into a recess defined between the light source and an optical portion of the backlight module. The rib includes two inclined surfaces within one surface presses onto the light source, and the other surface presses against the optical component so as to make the light source closely in contact with the heatsink.

7. The backlight module as recited in claim 6, wherein the rib is arranged on a common line of the inner wall of the horizontal tab of the front frame.

8. The backlight module as recited in claim 7, wherein the optical component includes at least one waveguide.

9. The backlight module as recited in claim 1, wherein the heatsink is an aluminum extrusion.

10. A liquid crystal display device comprising a backlight module which includes a light source, a heatsink, and a front frame, wherein the light source is arranged onto the heatsink, and the front frame is provided with at least a limiting arrangement pressing the light source intimately seated onto the heatsink 11. The liquid crystal display device as recited in claim 10, wherein the front frame includes a vertical tab and a horizontal tab having a certain angle arranged therebetween, the heatsink is arranged onto the vertical tab, and the light source is arranged on the vertical tab at a position distant to the front frame. The limiting arrangement is arranged on the inner wall of the horizontal tab.

12. The liquid crystal display device as recited in claim 11, wherein the limiting arrangement includes a rib or at least an embossment pressing against the light source so as to closely seat onto the heatsink.

13. The liquid crystal display device as recited in claim 12, wherein at least one rib is received into a recess defined between the light source and an optical portion of the backlight module. The rib includes two inclined surfaces within one surface presses onto the light source, and the other surface presses against the optical component so as to make the light source closely in contact with the heatsink.

14. The liquid crystal display device as recited in claim 13, wherein the rib is integrally formed with the horizontal tab of the front frame.

15. The liquid crystal display device as recited in claim 12, wherein at least one embossment is received into a recess defined between the light source and an optical portion of the backlight module. The rib includes two inclined surfaces within one surface presses onto the light source, and the other surface presses against the optical component so as to make the light source closely in contact with the heatsink.

16. The liquid crystal display device as recited in claim 15, wherein the rib is arranged on a common line of the inner wall of the horizontal tab of the front frame.

17. The liquid crystal display device as recited in claim 15, wherein the optical component includes at least one waveguide.

18. The liquid crystal display device as recited in claim 15, wherein the heatsink is an aluminum extrusion.

* * * * *